United States Patent
Wachi

(10) Patent No.: US 10,356,384 B2
(45) Date of Patent: Jul. 16, 2019

(54) IMAGE PROCESSING APPARATUS, IMAGE CAPTURING APPARATUS, AND STORAGE MEDIUM FOR STORING IMAGE PROCESSING PROGRAM

(71) Applicant: CANON KABUSHIKI KAISHA, Tokyo (JP)

(72) Inventor: Fumihito Wachi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 17 days.

(21) Appl. No.: 15/404,705

(22) Filed: Jan. 12, 2017

(65) Prior Publication Data
US 2017/0208311 A1    Jul. 20, 2017

(30) Foreign Application Priority Data

Jan. 14, 2016 (JP) ................. 2016-005278

(51) Int. Cl.

| | |
|---|---|
| H04N 13/122 | (2018.01) |
| H04N 13/207 | (2018.01) |
| H04N 13/302 | (2018.01) |
| G06T 7/593 | (2017.01) |
| G06K 9/46 | (2006.01) |
| G06T 3/40 | (2006.01) |
| G06T 5/00 | (2006.01) |
| G06T 5/50 | (2006.01) |

(Continued)

(52) U.S. Cl.
CPC ......... *H04N 13/122* (2018.05); *G06K 9/4604* (2013.01); *G06T 3/40* (2013.01); *G06T 5/005* (2013.01); *G06T 5/50* (2013.01); *G06T 7/593* (2017.01); *H04N 5/3572* (2013.01); *H04N 13/0217* (2013.01); *H04N 13/207* (2018.05); *H04N 13/302* (2018.05); *G06T 2207/10012* (2013.01); *G06T 2207/20104* (2013.01)

(58) Field of Classification Search
None
See application file for complete search history.

(56) References Cited

U.S. PATENT DOCUMENTS

2010/0246967 A1* 9/2010 Ando .................. G06T 5/009
382/190
2011/0310290 A1* 12/2011 Oouchida .............. G01C 3/085
348/348

(Continued)

FOREIGN PATENT DOCUMENTS

| JP | 2011-022796 A | 2/2011 |
|---|---|---|
| JP | 2012-070443 A | 4/2012 |
| JP | 2014-164497 A | 9/2014 |

*Primary Examiner* — Eileen M Davis
(74) *Attorney, Agent, or Firm* — Carter, DeLuca & Farrell LLP

(57) ABSTRACT

An image processing apparatus includes an image acquiring unit configured to acquire an input image generated by image capturing, a specifying unit configured to specify a first area in which unnecessary light contained in the input image is detected, a processing unit configured to perform, for the input image, a reducing process configured to reduce the first area specified by the specifying unit, and a providing unit configured to display the first area on a display unit, specified by the specifying unit in the input image, so that the first area can be recognized in the input image.

14 Claims, 14 Drawing Sheets

(51) Int. Cl.
*H04N 5/357* (2011.01)
*H04N 13/02* (2006.01)

(56) References Cited

U.S. PATENT DOCUMENTS

2014/0071247 A1* 3/2014 Imamura ................ G03B 35/08
                                                         348/49
2015/0269785 A1* 9/2015 Bell ...................... G06T 19/003
                                                         345/427

* cited by examiner

LIGHT SOURCE

GST

IMAGE PROCESSING APPARATUS, IMAGE CAPTURING APPARATUS, AND STORAGE MEDIUM FOR STORING IMAGE PROCESSING PROGRAM

BACKGROUND OF THE INVENTION

Field of the Invention

The present invention relates to an image processing technology for reducing influence of unnecessary light using a parallax image obtained by image capturing.

Description of the Related Art

When an image capturing apparatus, such as a digital still camera, captures an image, light incident on an image capturing optical system is partially reflected on a lens interface and/or a lens holder and reaches, as unnecessary light, an image capturing plane. The unnecessary light becomes ghost and flare, and a captured image has an area in which the unnecessary light is detected.

Japanese Patent Laid-Open No. ("JP") 2014-164497 discloses a method for estimating a light source direction that causes the unnecessary light. More specifically, the light source direction is estimated using a plurality of images obtained by image captures at a plurality of different viewpoints and an environmental map representing an environment in the image capturing scene.

JP 2012-070443 discloses a method for estimating a light source direction, for acquiring information on a ghost component based on the estimation result and information of an image capturing optical system, for subtracting the ghost component from a captured image (original image), and for obtaining a ghost reduced image in which a ghost component is reduced.

The light source direction estimating method disclosed in JP 2014-164497 needs to previously set an image capturing scene and to generate the environmental map of the image capturing scene, such as an image of a semispherical image capturing scene. This configuration restricts a freedom degree of a position, an angle, and the like of an image capturing apparatus, and image capturing may be unavailable with a user preferred position, angle, etc.

The ghost component reducing method disclosed in JP 2012-070443 estimates the light source direction based on one captured image, and has difficulties in improving the estimation precision. Since the precision of specifying the area in which the unnecessary light is detected may be low, it may be difficult to sufficiently reduce this area, or this method may reduce an area other than the area in which the unnecessary light is detected. A user cannot previously recognize this fact.

SUMMARY OF THE INVENTION

The present invention provides an image processing apparatus configured to provide a user with a reducible area in which unnecessary light is detected. The present invention provides an image capturing apparatus having the above image processing apparatus.

An image processing apparatus according to one aspect of the present invention includes one or more processors, and a memory storing instructions which, when executed by the one or more processors, cause the image processing apparatus to function as an image acquiring unit configured to acquire an input image generated by image capturing, a specifying unit configured to specify a first area in which unnecessary light contained in the input image is detected, a processing unit configured to perform, for the input image, a reducing process configured to reduce the first area specified by the specifying unit, and a providing unit configured to display the first area on a display unit, specified by the specifying unit in the input image, so that the first area can be recognized in the input image.

Further features of the present invention will become apparent from the following description of exemplary embodiments with reference to the attached drawings.

DESCRIPTION OF THE EMBODIMENTS

Referring now to the accompanying drawings, a description will be given of the embodiments of the present invention.

Prior to the description of specific embodiments, a description will now be given of common subject matter in each embodiment. Each embodiment uses a plurality of parallax images having a parallax as input images. An image capturing apparatus configured to generate these parallax images has an image capturing system configured to lead a plurality of light fluxes that have passed mutually different areas in a pupil in an image capturing optical system, to mutually different photoelectric converters (sub pixels) in an image sensor and to photoelectrically convert the light fluxes. For example, as disclosed in JP 2011-22796, the image capturing system may be an integrated system of a plurality of cameras arranged at different viewpoints.

Figure 3A:
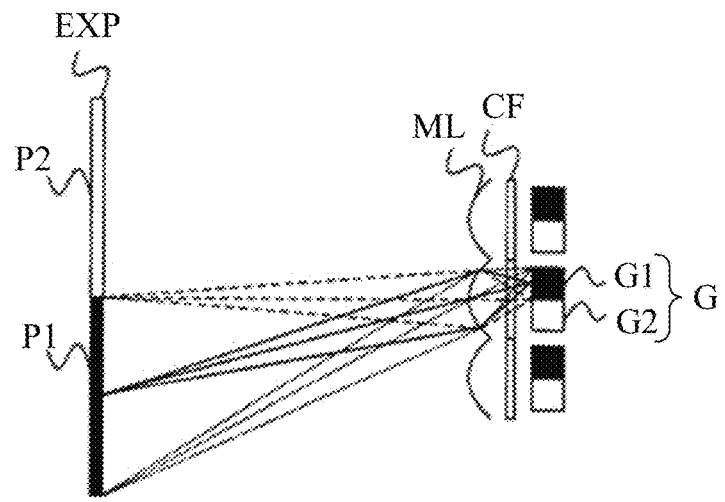
FIGS. 3A and 3B are views illustrating a relationship between a light receiving unit in an image sensor and a pupil in an image capturing optical system in an image capturing apparatus mounted with the image processing apparatus according to the first embodiment.

FIG. 3A schematically illustrates a relationship in an image capturing system between light receiving units in an image sensor and an exit pupil in an image capturing optical system. In FIG. 3A, ML denotes a micro lens. CF denotes a color filter. EXP denotes an exit pupil in the image capturing optical system. G denotes an imaging pixel, G1 and G2 denote light receiving units as a first sub pixel and a second sub pixel (referred to as "G1 pixel" and "G2 pixel" hereinafter). One imaging pixel G includes one G1 pixel and one G2 pixel. The image sensor has a plurality of two-dimensionally arranged imaging pixels G. The G1 and G2 pixels contained in each imaging pixel G are optically conjugate with the exit pupil EXP via the common micro lens ML. In the following description, the G1 pixels in the plurality of imaging pixels G arranged in the image sensor will be referred to as a "G1 pixel group," and the G2 pixels in the plurality of imaging pixels G will be referred to as a "G2 pixel group."

Figure 3B:
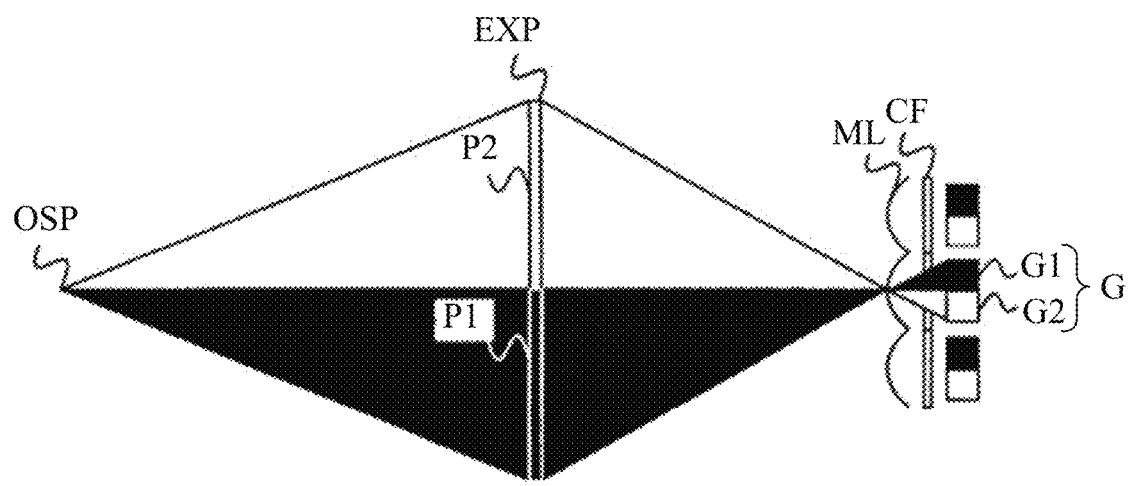

FIG. 3B schematically illustrates an image capturing system having a thin lens located at a position of the exit pupil EXP instead of the image capturing optical system. The G1 pixel receives a light flux that has passed P1 as a partial area in the exit pupil EXP (referred to as a "pupil area" hereinafter), and the G2 pixel receives a light flux that has passed P2 as another partial pupil area in the exit pupil EXP. OSP denotes is an object point that is being captured. The object does not have to exist at the object point OSP.

The light flux that has passed the object OSP enters the G1 or G2 pixel in accordance with the pupil area (position) in the exit pupil EXP. That the light fluxes have passed different areas in the exit pupil EXP means that incident light from the object point OSP is separated by the angle (parallax). An image generated using the output signals from the G1 pixels (G1 pixel group) provided for each imaging pixel and an image generated using the output signals from the G2 pixels (G2 pixel group) provided for each imaging pixel form a pair of parallax images mutually having a parallax.

A pupil division in the following description means that photoelectric converters receive light fluxes that have passed mutually different pupil areas in the exit pupil EXP. In FIGS. 3A and 3B, two obtained images are treated as parallax images even though the conjugate relationship is imperfect or the pupil areas P1 and P2 partially overlap each other due to a positional shift of the exit pupil EXP.

First Embodiment

Figure 4:
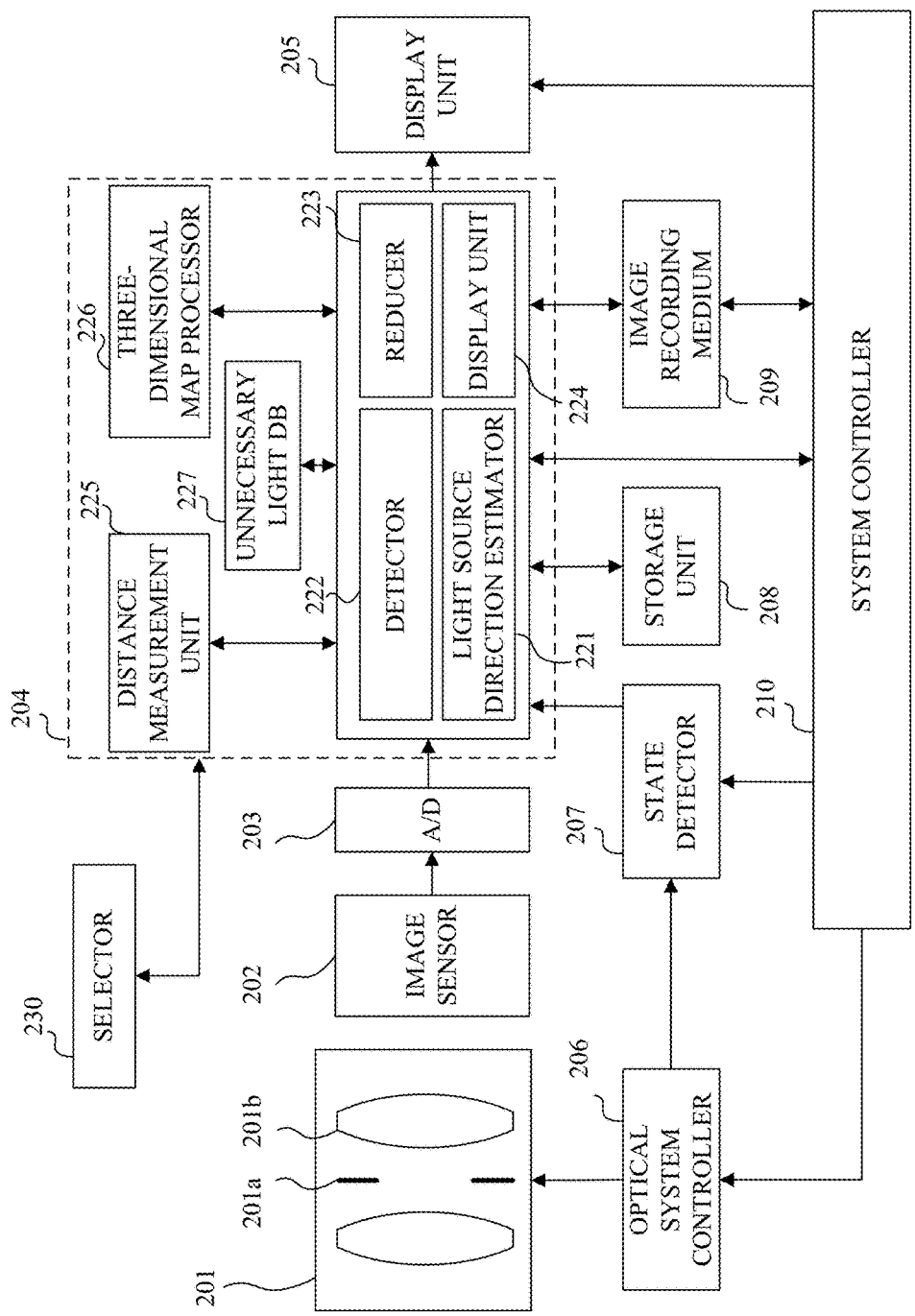
FIG. 4 is another view illustrating a relationship between a light receiving unit in an image sensor and a pupil in an image capturing optical system.

FIG. 4 illustrates a basic configuration of an image capturing apparatus including an image processing apparatus according to a first embodiment of the present invention. An image capturing optical system 201 that includes an aperture stop 201a and a focus lens 201b forms an image of light from an unillustrated object on an image sensor 202. The image sensor 202 that includes a photoelectric converter, such as a CCD sensor and a CMOS sensor, receives light fluxes that have passed mutually different pupil areas in the exit pupil EXP described with reference to FIGS. 3A and 3B, at sub pixels G1 and G2 corresponding to the pupil areas for the pupil division.

An analog electric signal generated by the photoelectric conversion in the image sensor 202 is converted into a digital signal by an A/D converter 203, and the digital signal is input into an image processor 204 as an image processing apparatus.

The image processor 204 generates captured images (a pair of parallax images as input images) by image processing generally performed for the digital signal. The image processor 204 serves as an image acquiring unit configured to acquire the input image.

The image processor 204 includes a light source direction estimator (light source data acquiring unit) 221, a detector 222, a reducer (processing unit) 223, and a display unit (providing unit) 224. The light source direction estimator 221 and the detector 222 form a specifying unit.

The light source direction estimator 221 performs a process for estimating a direction of the light source configured to irradiate the object in the image capturing so as to acquire a pair of parallax images. A detailed description of the estimation process will be described later. The detector 222 detects a first area as an unnecessary image area caused by unnecessary light, which will be described later, or performs a process for specifying (estimating) the first area in which unnecessary light is detected. A detailed description will be given of the detection process (specifying process) later. The reducer 223 performs a correction process (reducing process) configured to reduce the detected first area, for a pair of parallax images generated by image capturing. A detailed description of the correction process will be given later. The display unit 224 performs a display process (providing process) configured to display the detected first area in the process target image, so that the first area can be recognized in the input image on the display unit 205. A detailed description of the display process will be given later. The display unit may be an external display unit connectible to the image capturing apparatus through a wire or wireless communication.

An image for recording (in which the first area is reduced) generated by the image processing by the image processor 204 may be recorded in an image recording medium by a recorder (recording unit) 209, such as a semiconductor memory and an optical disc, or displayed on the display unit 205.

The system controller 210 controls the photoelectric conversion in the image sensor 202, the image processing in the image processor 204, and the operations in the image capturing optical system 201 (aperture stop 201a and the focus lens 201b). An optical system controller 206 mechanically drives the aperture stop 201a and the focus lens 201b in the image capturing optical system 201 in accordance with a control command from the system controller 210.

The aperture stop 201a adjusts a light quantity when its aperture diameter is controlled in accordance with a set F-number. A position of the focus lens 201b is controlled by an unillustrated autofocus (AF) system and a manual focus unit for focusing in accordance with an object distance. A state detector 207 acquires various states (F-number, object distance corresponding to the position of the focus lens 201b, and a focal length when zoom is available) of the image capturing optical system at that time (at present) in accordance with a command from the system controller 210, or the state detector 207 acquires the information of the image capturing condition.

While FIG. 4 illustrates the image capturing optical system 201 as part of the image capturing apparatus, the image capturing optical system 201 may be interchangeable with the image capturing apparatus that includes the image sensor 202.

A distance measurement unit 225 acquires, based on a pair of parallax images, distance data as data on the object distance for one or more objects that appear in part or whole parallax images.

A three-dimensional map processor 226 generates a three-dimensional map representing a three-dimensional shape of the object using the distance data acquired by the distance measurement unit 225. The reference shape may be used to represent (build) the three-dimensional object. The reference shape may contain a visage, a physique, a hairstyle, an automobile, an airplane, a railway, etc. The three-dimensional map processor 226 acquires and calculates normal vector (plane normal data) of each of the plurality of planes on the object in the three-dimensional map.

The light source direction estimator 221 estimates the light source direction using the normal vector acquired by the three-dimensional map processor 226. This embodiment calculates the light source direction from a bidirectional reflectance distribution function ("BRDF") that expresses a reflection characteristic on the plane, using an angle between the normal direction of the (reflective) plane of the object and the light source direction. In other words, the brightness (luminance) of the plane on the object calculated by the BRDF and the brightness of the pixel corresponding to the plane in the parallax image are compared with each other, and the light source direction can be calculated by calculating the difference and ratio for each of the plurality of planes. For an unknown reflectance of the reflective surface, the reflection of the reflective surface is considered to be only a diffuse reflection. When it follows the Lambertian (perfect diffuse) model, the luminance of the light source can be calculated and the light source direction can be calculated based on the luminance of the light source calculated from the plurality of planes (facets).

Figure 13:
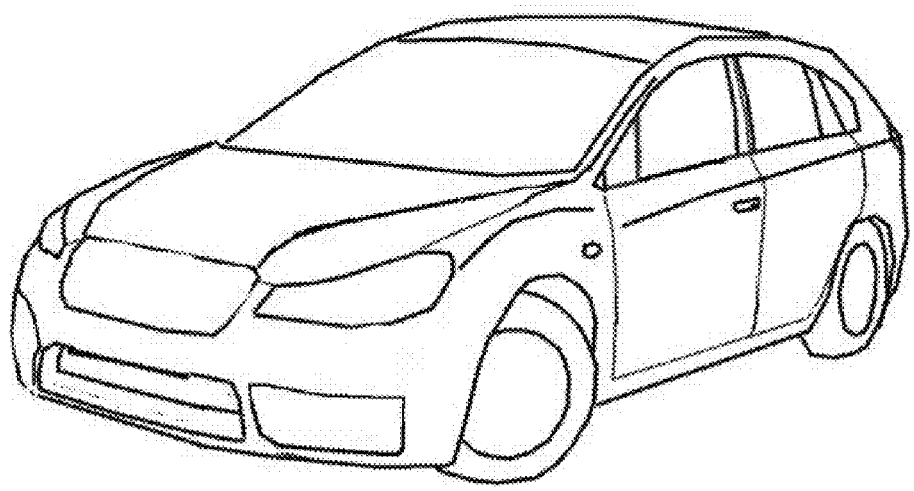
FIG. 13 is a view for explaining a three-dimensional map used for each embodiment.

FIG. 13 illustrates an illustrative three-dimensional map generated using the pair of parallax images obtained by capturing the object. In the actual image capturing, the spatial frequency changes in the sampling due to the object magnification, but the resolution of each parallax image in this embodiment or the resolution in the three-dimensional map is as fine as that illustrated in FIG. 13. The resolution in the three-dimensional map changes due to the image sensor size.

Figure 14:
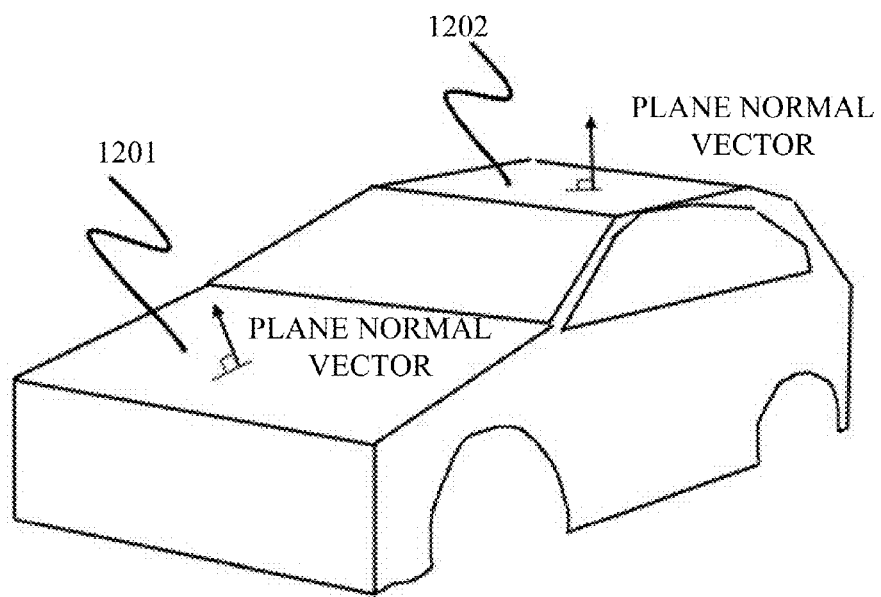
FIG. 14 is a view for explaining a reference shape used for each embodiment.

FIG. 14 illustrates an example in which the three-dimensional map illustrated in FIG. 13 is applied to the reference shape. When the three-dimensional map is applied to the reference shape, it is likely that the plane data used to detect the direction of the light source (light source direction) is simplified and easily acquired. A calculation concept of the light source direction will be described using a bonnet surface 1201 and a roof surface 1202.

Initially, angles of the bonnet surface 1201 and the roof surface 1202 to the base plane of the three-dimensional map are calculated based on the three-dimensional map. This embodiment sets the ground to the base plane. Then, based on the calculated angles, this embodiment calculates angles of the normal directions (referred to as "normal directions" hereinafter) of the bonnet surface 1201 and the roof surface 1202 or the angles of the plane normal vectors. FIG. 14 schematically illustrates a plane normal vector of each of the bonnet surface 1201 and the roof surface 1202.

Next, the BRDF is calculated which corresponds to the angle between the normal direction of each of the bonnet surface 1201 and the roof surface 1202 and the image capturing optical axis. The BRDF for a material of the reflective surface corresponding to the bonnet surface 1201 and the roof surface 1202 is previously stored as table data and a type of the object is specified based on the reference shape of the selected object, and the BRDF of a type of the specified object is selected from the BRDF table data.

Figure 15:
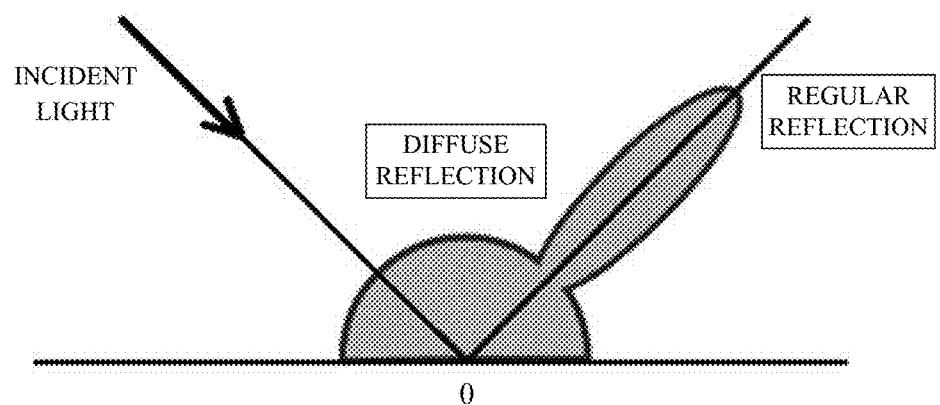
FIG. 15 is a view for explaining BRDF used for each embodiment.

FIG. 15 is a graph that plots the reflectance for incident light entering the reflective surface at a certain incident angle. The incident light entering an origin 0 causes a regular reflection component and a diffuse reflection component. A distance from the origin 0 to the plotted point (continuously arranged points) represents the reflectance. The regular reflection component has the highest reflectance, and the diffuse reflection component has almost the same reflectances in all directions. As the incident angle of the incident light changes, the shape of the graph changes accordingly. The BRDF table data contains BRDF data for each incident angle. The BRDF changes due to the reflection condition, such as the material of the reflective surface and the state of the surface. The BRDF table data may contain the BRDF for each combination of all different reflection conditions. Alternatively, the BRDF table data may contain the BRDF (representative BRDF) for each of a plurality of representative combinations, and may calculate the BRDF for another combination using an interpolation calculation, such as a linear interpolation using the representative BRDF. This configuration can make a smaller data amount of the table data than that when the BRDF table data contains the BRDF for all combinations.

Although it is not illustrated in FIG. 15, light actually entering the object has an absorbed component and energy and thus the component and energy lost by the absorptions may be also considered. Assume that the object reflection follows the Lambertian model when the reference shape of the object cannot be specified. Then, the BRDF can be calculated based on the angle between the normal direction of the reflective surface and the image capturing optical axis.

Figure 16:
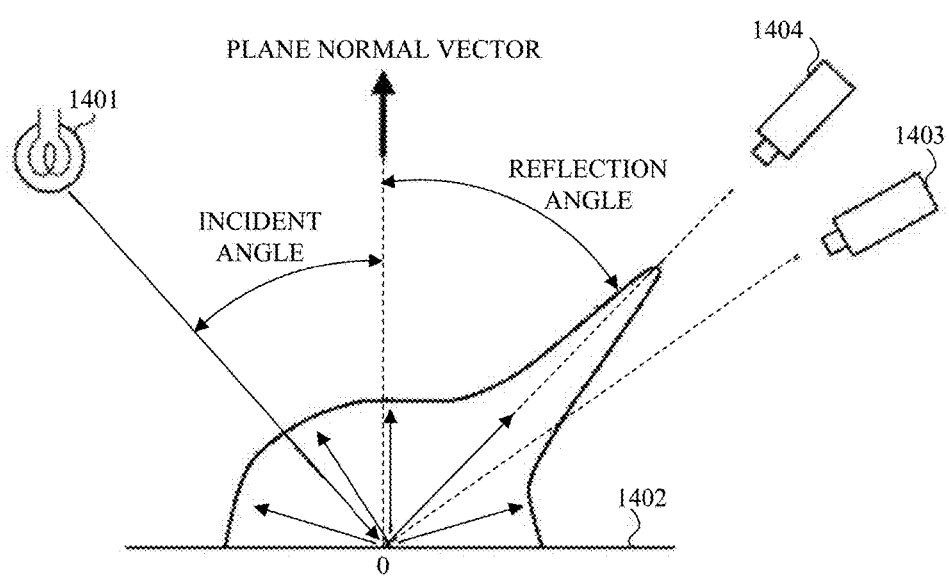
FIG. 16 is a view for explaining a method for calculating a light source direction based on the BRDF on surface of a reference shape in each embodiment.

The light source direction that matches the plurality of reflective surfaces can be calculated based on the obtained BRDF for the plurality of reflective surfaces (such as the bonnet surface 1201 and the roof surface 1202). FIG. 16 illustrates this concept. In FIG. 16, two reflective surfaces 1402 of the bonnet surface 1201 and the roof surface 1202 (illustrated as one reflective surface in FIG. 16) have the equivalent materials and equivalent BRDFs. Light from a light source 1401 enters and is reflected on the reflective surface 1402. Two cameras 1403 and 1404 capture images of the reflected light. At this time, depending on the plane normal vector of the reflective surface 1402 from the light source 1401, the incident angle of the light entering the reflective surface 1402 and the reflected angle of the light reflected on the reflective surface 1402 are different from each other, and the reflectances are also different from each other. Hence, the light source direction can be specified using the luminance value of the reference image and the reflectance calculated from the BRDF by assuming the light source positions to the plurality of reflective surfaces.

For example, in FIG. 16, assume the light source 1401 disposed at a certain position and images captured by the cameras 1403 and 1404 in different reflection angle directions on the basis of the plane normal vector. In the example illustrated in FIG. 16, the reflectance toward the camera 1404 is higher than that toward the camera 1403. Hence, the camera 1404 captures an image brighter than that captured by the camera 1403. For the known BRDF, the light source direction can be calculated based on the reflectances in the directions (angles) towards the cameras 1403 and 1404, using the BRDF and the difference of the image luminance values obtained by the cameras 1403 and 1404. One spatial coordinate is obtained as an intersection between lines that extend in the light source directions from a plurality of reflective surfaces. This is the position of the light source. Once the position and the direction of the light source are obtained, the luminance value of the reflective surface is calculated based on the reference image, and the luminance of the light source can be calculated based on the reflectance and the luminance value at arbitrary part in the reference image.

Next, the unnecessary light data is obtained from an unnecessary database (referred to as an "unnecessary light DB" hereinafter) 227, information of the image capturing condition (such as an F-number, a focal length, and an object distance) obtained from the state detector 207, and data (light source data) on the light source representing the position, the direction and the luminance of the light source. The unnecessary light DB is previously stored in a memory (storage unit). The unnecessary light data is data relating to the first area in the image in which the unnecessary light is detected, and contains at least one of the appearance position, intensity, hue, magnitude, shape, and another characteristic of the first area.

Figure 5A:
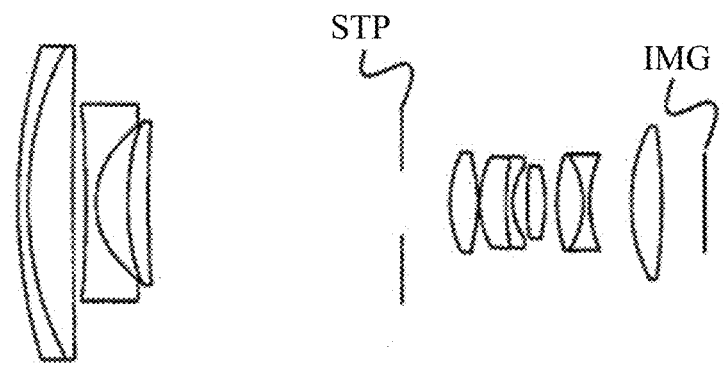
FIGS. 5A to 5C are views for explaining an unnecessary light that occurs in the image capturing optical system.
Figure 5B:
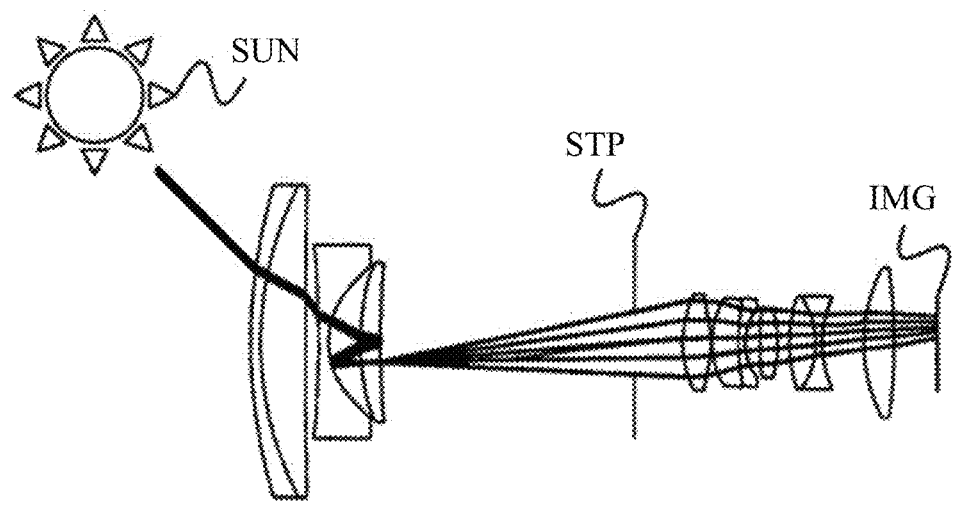

FIG. 5A illustrates a concrete configuration example of the image capturing optical system 201. STP denotes an aperture stop. IMG denotes an image capturing plane, on which the image sensor 202 is disposed as illustrated in FIG. 4. FIG. 5B illustrates that intensified light enters the image capturing optical system 201 from the sun SUN as an illustrative high luminance object, and the light reflected on the lens interface in the image capturing optical system 201 reaches as unnecessary light (ghost and flare) the image capturing plane IMG.

When a diffractive optical element is used for the lens closest to the object instead of the illustrated state, the light from the high luminance object, such as the sun, outside the image capturing angle of view enters the diffractive optical element and a blurred light flux separate from the image capturing light flux may appear in the entire captured image.

Figure 5C:
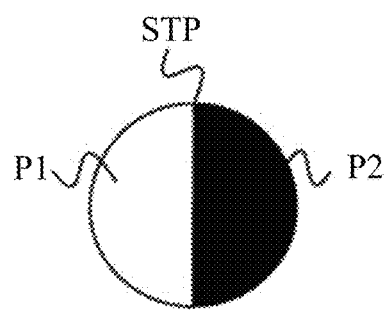

FIG. 5C illustrates pupil areas P1 and P2 through which light fluxes enter the G1 and G2 pixels illustrated in FIGS. 3A and 3B in the aperture stop STP (or the exit pupil in the image capturing optical system 201). The light flux from the high luminance object passes almost the whole area in the aperture stop STP, but areas which the light fluxes that enter the G1 and G2 pixels pass are classified into the pupil areas P1 and P2.

Referring now to FIGS. 1A to 1F and 2A and 2B, a description will be given of one method for detecting the first area that appears when the unnecessary light is photoelectrically converted in the captured image generated by image capturing by the image capturing system (image capturing optical system 201 and the image sensor 202).

Figure 2A:
FIGS. 2A and 2B are views of illustrative output images obtained by the image processing according to the first embodiment.
Figure 2A:
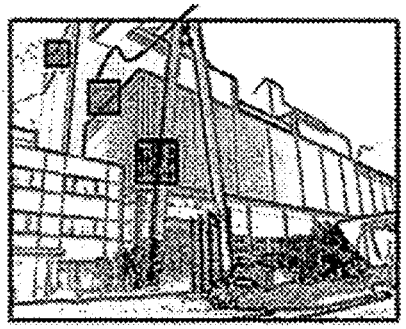

FIG. 2A illustrates a captured image generated by image capturing by the image sensor 202. A structure, such as a building, and surrounding trees are captured in a second area other than the first area in the captured image. A rectangle GST in the captured image is the first area as an image component of the unnecessary light (such as the ghost and flare). This example locates the light source outside the captured image, and disposes the light source on an extension line of the unnecessary light. A relationship between the light source and the unnecessary light may have a variety of combinations, and is not limited to this example illustrated in FIG. 2A.

FIG. 2A illustrates the first area GST in light black dots, but the object may be transparent to some extent due to the appearance intensity of the unnecessary light or clipped whites. The first area is a captured object image covered with unnecessary light, and thus has a higher luminance than that of the object image. This is true of figures in a second embodiment, which will be described later.

Figure 1A:
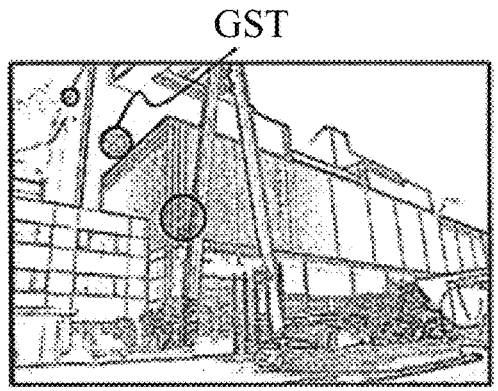
FIGS. 1A-1F are views for explaining image processing performed by an image processing apparatus according to a first embodiment of the present invention.
Figure 1B:
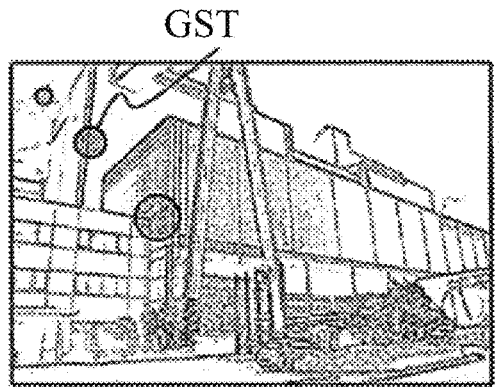

FIGS. 1A and 1B illustrate a pair of parallax images obtained as a result of a photoelectric conversion of the light fluxes that have passed the pupil areas P1 and P2, by the G1 and G2 pixel groups. A difference (referred to as an "object parallax component" hereinafter) corresponding to the parallax clearly exists in the second area in the pair of parallax images obtained by capturing an image of the short distance object. However, an amount of object parallax component in the pair of parallax images obtained by capturing the image of a long distance object, such as a landscape illustrated in FIGS. 1A and 1B, is very small. The pair of parallax images contain the first areas GST schematically illustrated as a black dot, but their positions are different between the parallax images. While the first areas GST are separated without overlapping each other, they may overlap each other with a luminance difference. In other words, the positions or the luminances of the first areas in a block dot may be different from each other.

Figure 1C:
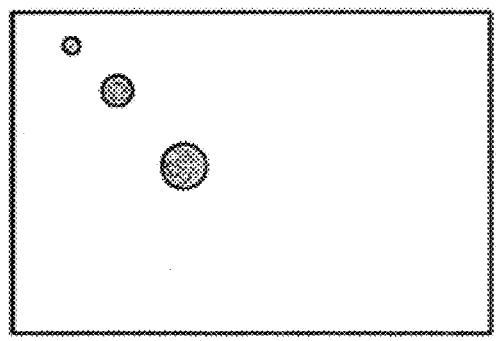

FIG. 1C illustrates an image (referred to as a "relative difference image" hereinafter) obtained by subtracting a parallax image (subtraction image) illustrated in FIG. 1B from a base image that has been set to the parallax image illustrated in FIG. 1A among the pair of parallax images illustrated in FIGS. 1A and 1B. The relative difference image that represents a difference between the base image and the subtraction image contains the object parallax component and a first area as two-dimensional data (referred to as "relative difference information" hereinafter) on a difference between the pair of parallax images. However, as described above, an amount of the object parallax component between the pair of parallax images obtained by capturing the long distance object, such as a landscape, is so small that its influence is negligible. Moreover, the subtraction of the subtraction image illustrated in FIG. 1B from the base image illustrated in FIG. 1A provides the first area contained in FIG. 1B as a negative value. This embodiment truncates the negative value in FIG. 1C (or treats the negative value as 0) so as to simplify the subsequent correction process configured to reduce the first area. Hence, the relative difference image in FIG. 1C represents only the first area contained in the base image in FIG. 1A.

Figure 1D:
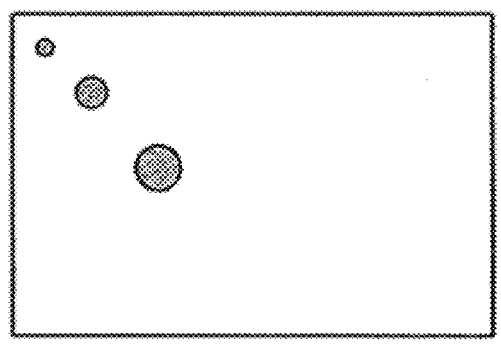

Similarly, FIG. 1D illustrates a relative difference image that contains relative difference information obtained by subtracting the subtraction image illustrated in FIG. 1A from a base image that has been set to the parallax image illustrated in FIG. 1B. Similar to the relative difference image illustrated in FIG. 1C, the first area contained in FIG. 1A by the subtraction is calculated as a negative value but the negative value is truncated in FIG. 1D so as to simplify the correction process configured to reduce the first area. Hence, the relative difference image in FIG. 1D represents only the first area contained in FIG. 1B.

This embodiment provides a process configured to leave (separate or extract) only the first area in the relative difference image obtained by subtracting one (subtraction image) of the pair of parallax images from the other (base image) of the parallax images. This configuration can detect the first area.

Figure 1E:
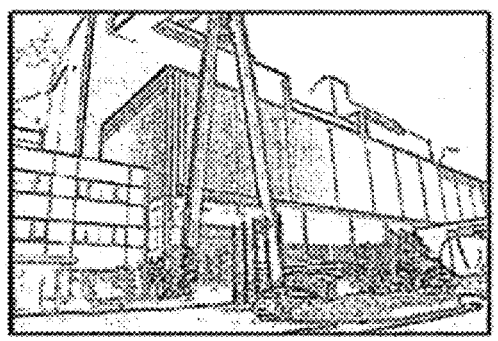
Figure 1F:
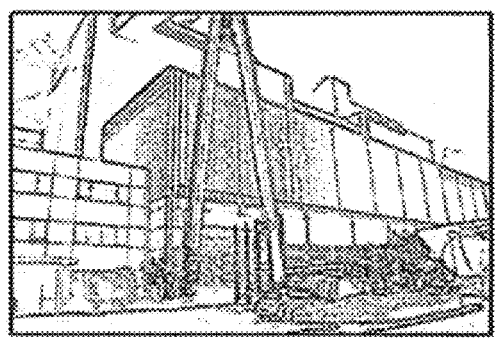
Figure 2B:
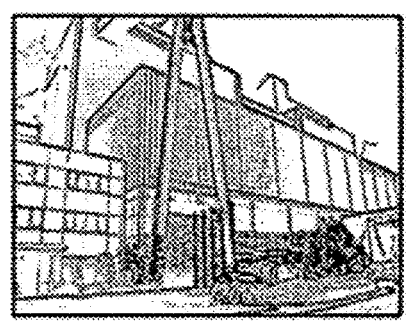

Next, the correction process configured to reduce the first area illustrated in FIGS. 1C and 1D detected as described above is performed for the original parallax images illustrated in FIGS. 1A and 1B. Thereby, the pair of parallax images can be obtained as images for recording in which the first area is reduced (almost eliminated) as illustrated in FIGS. 1E and 1F. One image for recording can be generated which is equivalent with the captured image generated by image capturing without a pupil division and contains few first area, as illustrated in FIG. 2B, by combining the pair of parallax images in which the first area is reduced.

This embodiment performs a display process configured to display, before the image for recording is recorded, the first area specified in the above steps, as a preview image on the display unit 205 or the external display apparatus with or separate from the second area other than the first area in the captured image. In this case, the first area may be highlighted and displayed by enhancing or lowering its luminance, meshing or blinking the first area. Thereby, the user can recognize (or predict) how much the first area is reduced before the image for recording is recorded. The result of the correction process of the first area may be simultaneously displayed.

Moreover, the correction process may be transferred automatically by the system controller 210 when the system controller 210 determines that it is the best timing or at user designated timings. The correction process may be performed only for the first area designated by the user, or for all detected first areas.

Figure 6:
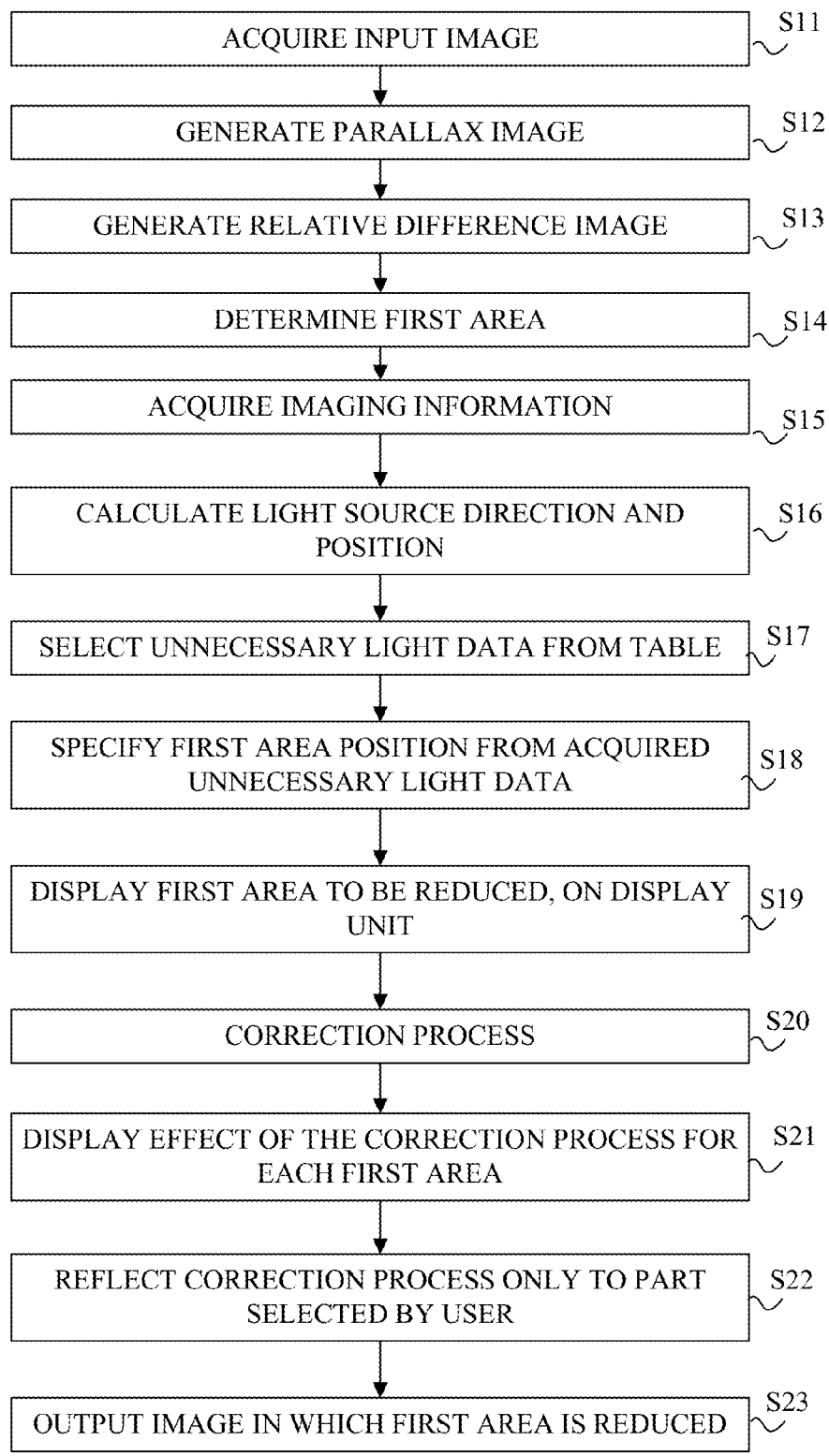
FIG. 6 is a flowchart illustrating the image processing according to the first embodiment.

A flowchart in FIG. 6 illustrates a flow of the detection process, the correction process, and the display process of the first area. The system controller 210 and the image processor 204 each serving as a computer execute these processes in accordance with the image processing program as a computer program.

In the step S11, the system controller 210 controls the image capturing system including the image capturing optical system 201 and the image sensor 202, and captures an image of the object.

Next, in the step S12, the system controller 210 makes the image processor 204 generate a pair of parallax images as input images using the digital signal that is output from the image sensor 202 and A/D converted by the A/D converter 203. Herein, the image processor 204 may execute a normal development process and a variety of image processes so as to generate the parallax images.

Next, in the step S13, the detector 222 obtains the relative difference information between the pair of parallax images. In other words, the relative difference image (FIG. 1C) is obtained where the base image is set to FIG. 1A and the subtraction image is set to FIG. 1B, and the relative difference image (FIG. 1D) is obtained where the base image is set to FIG. 1B and the subtraction image is set to FIG. 1A. When the unnecessary light fluxes that reach the image capturing plane pass different pupil areas in the image capturing optical system 201, the first area appear at a different position for each parallax image, as illustrated in FIGS. 1A and 1B. Therefore, the first image has a positive or negative difference value in the simple relative difference image.

For example, when the subtraction image illustrated in FIG. 1B is subtracted from the base image illustrated in FIG. 1A in order to generate the relative difference image illustrated in FIG. 1C, the first area in the base image has a positive value and the first area contained in the subtraction image has a negative value. As described above, this embodiment truncates the negative value (one of the positive value and the negative value) and makes the negative value 0 (treats the negative value as 0) so as to simplify the subsequent correction process to the first image. Only the first area having a positive value contained in FIG. 1A is detected in the relative difference image illustrated in FIG. 1C. On the other hand, when only the first area illustrated in FIG. 1D is generated by subtracting the subtraction image illustrated in FIG. 1A from the base image illustrated in FIG. 1B, only the first area contained in the base image illustrated in FIG. 1B is detected as a positive value in the relative difference image.

When the relative difference information is obtained for the image obtained by capturing an image of the short distance object, an alignment process between the pair of parallax images may be performed so as to remove the object parallax component. In the alignment, one of the pair of parallax images is shifted from the other parallax image and the shift position is determined so as to maximize the correlation between the parallax images. Alternatively, the shift position may be determined so as to minimize the square sum of the difference between the parallax images. The shift position for the alignment may be determined in the in-focus area in the parallax images. An edge may be previously detected in each parallax image, and the shift position may be determined for the alignment using the image representing the detected edge. This method unnecessarily determines the shift position in the in-focus area, because it is likely that a high contrast edge is detected in the in-focus area and it is less likely that an edge is detected in a low-contrast defocus area, such as a background.

Next, in the step S14, the detector 222 determines the remaining component as the first area in the relative difference image obtained in the step S13. Thus, the first area is detected in each original parallax image.

Next, in the step S15, the image processor 204 obtains information of the image capturing apparatus in the image capturing. More specifically, the information contains attitude information of the image capturing apparatus (information representing the attitude of the image sensor 202), an ID number, and a type number, and an image capturing condition (such as an F-number, a focal length, and an object distance) of the image capturing optical system 201.

Next, in the step S16, the light source direction estimator 221 generates a three-dimensional map of the object illustrated in FIG. 13 based on the pair of parallax images generated in the step S12, and three-dimensionally builds the object. Moreover, the above method obtains light source data (the position, the direction, and the luminance of the light source) using the three-dimensional map and the above method.

Next, in the step S17, the detector 222 selects and obtains the unnecessary light data based on the unnecessary light DB 227, the information of the image capturing apparatus in the image capturing obtained in the step S15, and the light source data obtained in the step S16. In this stage, the reduction effect of the first area represented by the unnecessary light data obtained from the unnecessary light DB 227 can be predicted.

Next, in the step S18, the detector 222 specifies the position in the first area in each parallax image represented by the unnecessary light data obtained in the step S17.

Next, in the step S19, the display unit 224 displays the specified first area as a pre-recorded preview image of the image for recording, on the display unit 205 or the external display apparatus with or separate from the second area other than the first area. In this case, as described above, the first area may be highlighted and displayed by enhancing or lowering its luminance, or meshing or blinking the first area.

Next, in the step S20, the reducer 223 performs a correction process configured to reduce the first area for the pair of parallax images obtained by image capturing, and generates the pair of parallax images in which the first area is reduced.

This embodiment generates the parallax image (FIG. 1E) based on the output signal of the G1 pixel group in the image sensor 202, and the parallax image (FIG. 1F) based on the output signal of the G2 pixel group. In this case, in the step S13, the negative value is truncated and set to 0, and only the first area contained in each parallax image is detected as a positive value in the relative difference image. Therefore, the first area can be reduced (eliminated) by simply subtracting the relative difference image from each parallax image. In other words, the pair of parallax images can be obtained in which the first area is reduced, by subtracting the relative difference image illustrated in FIG. 1C from the parallax image illustrated in FIG. 1A and by subtracting the relative difference image illustrated in FIG. 1D from the parallax image illustrated in FIG. 1B.

Next, in the step S21, the display unit 224 displays the pair of parallax images (images for recording) in which each specified first area is corrected on the display unit 205 or the external display apparatus so as to exhibit the reduction effect for each specified first area. Thereby, the user can recognize how much the first area is reduced before the image for recording is recorded.

Next, in the step S22, the display unit 224 reflects the result of the correction process only for the first area selected by the user through a selector 230 among the specified first area. For example, this configuration can provide an image for recording in which the first area desired to leave by the user is left, and an image for recording in which a component other than the first area is not reduced, which has been determined as the first area by a false detection.

Finally, in the step S23, the system controller 210 records the pair of parallax images in which the first area illustrated in FIGS. 1E and 1F are reduced or removed, as the images for recording in an image recording medium through the recorder 209 or displays the parallax images on the display unit 205. A combination of the pair of parallax images also enables one image for recording to be recorded or displayed in which the first area is sufficiently reduced and which is equivalent with the captured image generated by the image capturing without a pupil division as illustrated in FIG. 2B.

As described above, this embodiment can detect the first area in each parallax image (base image) using the difference (relative difference information) between each base image and the other parallax image when each of the two parallax images obtained by once image capturing is set to the base image. In other words, this embodiment can detect the first area contained in the captured image without performing a plurality of image captures. In order to truncate the first area having a negative value in generating the relative difference information, the first area having a positive value can be detected as only a simple subtraction. Hence, a high-quality image for recording can be obtained in which the first area is well reduced (removed) by subtracting this first area from the original parallax image.

Before the post-captured image for recording is recorded, the first area to be reduced is displayed to the user and thus the user can predict the reduction result of the first area before the image for recording is recorded. This configuration can definitely reduce the first area to be reduced, and prevent the second area that is not the first area from being reduced.

Second Embodiment

Next follows a description of a second embodiment according to the present invention. This embodiment describes use of the image capturing apparatus that provides (four) pupil divisions more than that of the first embodiment. The image capturing apparatus and the image capturing optical system 201 according to this embodiment have the same basic configurations as those of the first embodiment (FIG. 4), and common components will be designated by the same reference numerals.

Figure 7A:
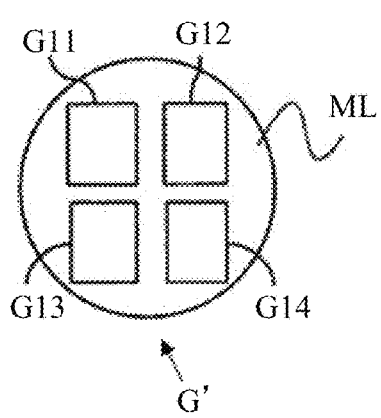
FIGS. 7A and 7B are views for explaining unnecessary light that transmits the light receiving unit in the image sensor and an aperture stop in the image capturing optical system.

FIG. 7A illustrates light receiving units in an image sensor in an image capturing system in the image capturing apparatus according to this embodiment. In FIG. 7A, ML denotes a micro lens. G11, G12, G13, and G14 denote the light receiving units as sub pixels (referred to as a "G11 pixel," a "G12 pixel," a "G13 pixel," and a "G14 pixel" hereinafter). One imaging pixel G' contains these four sub pixels. The image sensor has a plurality of two-dimensionally arranged imaging pixels G'. The G11 pixel, G12 pixel, G13 pixel, and G14 pixel contained in each imaging pixel G' are optically conjugate with the exit pupil via the common micro lens ML. In the following description, the G11 pixels, G12 pixels, G13 pixels, and G14 pixels in the plurality of imaging pixels G' arranged in the image sensor will be referred to as a "G11 pixel group," a "G12 pixel group," a "G13 pixel group," and a "G14 pixel group," respectively.

Figure 7B:
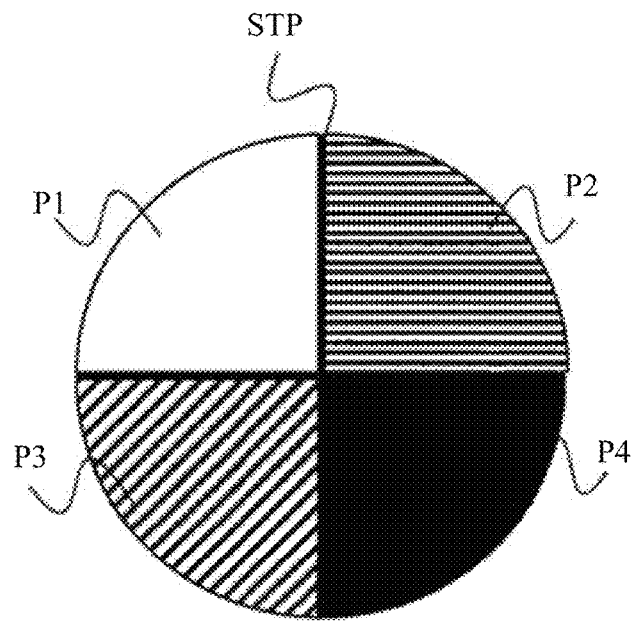

FIG. 7B illustrates pupil areas P1, P2, P3, and P4 through which light fluxes enter the G11 pixel, G12 pixel, G13 pixel, and G14 pixel illustrated in FIG. 7A in the aperture stop STP (or the exit pupil in the image capturing optical system). The light fluxes from the high luminance object pass almost the entire area in the aperture stop STP, and the light flux incident on one of the G11 pixel, G12 pixel, G13 pixel, and G14 pixel passes one of the pupil areas P1, P2, P3, and P4.

Referring now to FIGS. 8A to 11F, a description will now be given of a method for detecting a first area as an image component that appears when the unnecessary light is photoelectrically converted in a captured image generated by the image capturing with the image capturing apparatus.

Figure 8A:
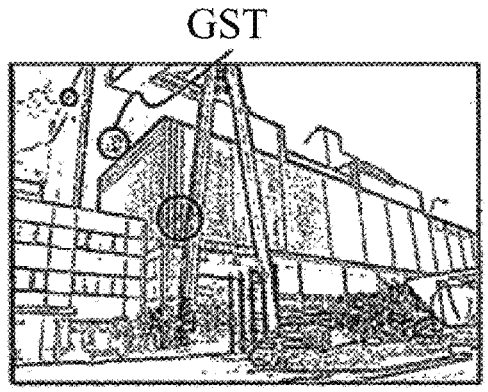
FIGS. 8A to 8F are views each illustrating illustrative output images obtained by image processing performed in an image processing apparatus according to a second embodiment of the present invention.
Figure 10A:
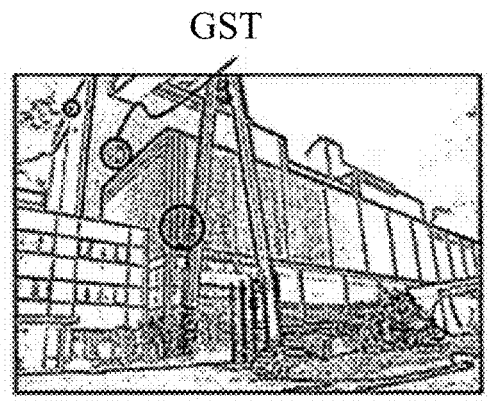
FIGS. 10A-10F are other views for explaining image processing performed in the second embodiment.

This embodiment also generates the captured image illustrated in FIG. 2A, for example, through image capturing by the image sensor 202. FIGS. 8A, 8B, 10A, and 10B illustrate a set of (four) parallax images obtained as a photoelectric conversion result of the light fluxes that have passed the pupil areas P1, P2, P3, and P4 at the G1 pixel group, the G2 pixel group, the G3 pixel group, and the G4 pixel group. The set of parallax images contain the schematically illustrated first areas GST in light black dot, which have the same positions between the parallax images illustrated in FIGS. 8A and 10A and the same positions between the parallax images illustrated in FIGS. 8B and 10B. The positions of the first area GST for the parallax images illustrated in FIGS. 8A and 10A are different from the positions for the parallax images illustrated in FIGS. 8B and 10B.

Figure 8B:
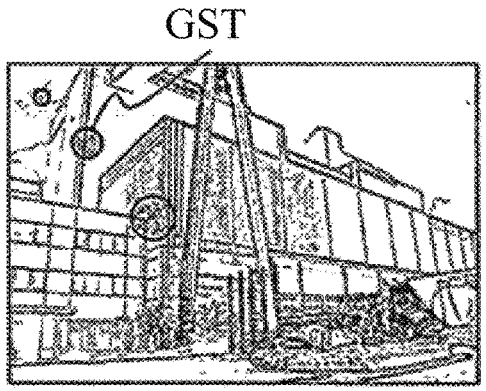
Figure 8C:
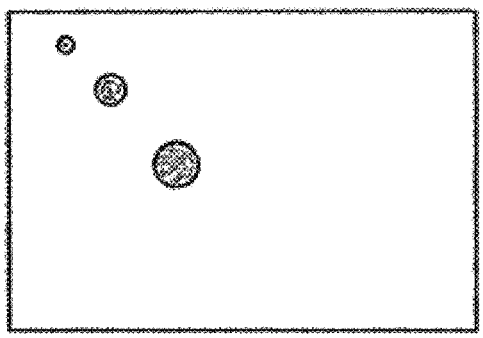

FIG. 8C illustrates a relative difference image obtained by subtracting the parallax image (subtraction image) illustrated in FIG. 8B from a base image that is set to the parallax image illustrated in FIG. 8A. This relative difference image contains the first area and the object parallax component (relative difference information) as the two-dimensional data as described in the first embodiment. However, similar to the first embodiment, an amount of the object parallax component is so small that its influence is negligible. Moreover, similar to the first embodiment, the subtraction that subtracts the subtraction image from the base image provides the first area as a negative value contained in the parallax image illustrated in FIG. 8B. However, in order to simplify the subsequent correction process configured to reduce the first area, this embodiment truncates the negative value and treats it as 0 in the relative difference image illustrated in FIG. 8C. This is applied to all relative difference images. Therefore, the relative difference image illustrated in FIG. 8C represents only the first area in FIG. 8A as relative difference information.

Figure 8D:
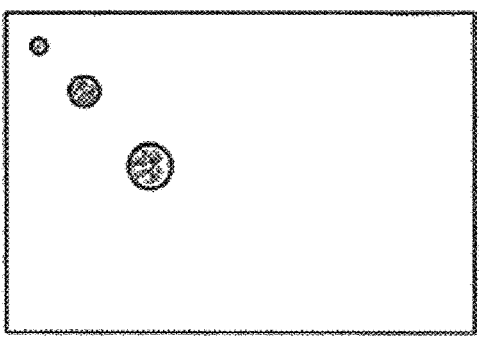
Figure 8E:

FIG. 8E illustrates the relative difference image obtained by subtracting the parallax image (subtraction image) illustrated in FIG. 10A from a base image that is set to the parallax image illustrated in FIG. 8A. This relative difference image also contains the object parallax component (relative difference information) but an amount of the object parallax component is so small that its influence is negligible. Moreover, as described above, the first areas exist at the same positions between the parallax image illustrated in FIG. 8A and the parallax image illustrated in FIG. 10A, and thus the first area is not detected as the relative difference information. Hence, the first areas at the same positions do not appear in the relative difference image. In other words, the undetectable first area exists in the relative difference information between the two parallax images. However, this embodiment obtains the relative difference information among the four parallax images, and can detect the first area, for example, if the first area occurs at a position different from that for the base image in at least one parallax image, as in the parallax image illustrated in FIG. 8B.

Figure 9A:
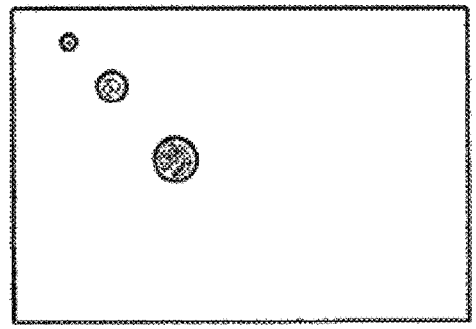
FIGS. 9A-9F are other views for explaining image processing performed in the second embodiment.
Figure 10B:
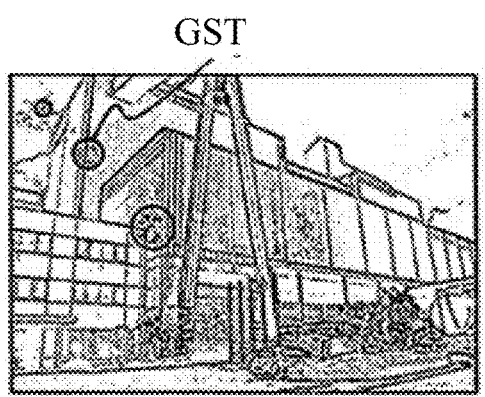

Moreover, FIG. 9A illustrates the relative difference image obtained by subtracting the parallax image (subtraction image) illustrated in FIG. 10B from a base image that is set to the parallax image illustrated in FIG. 8A. Since the positions of the first areas are different between FIG. 8A and FIG. 10A, the relative difference image illustrated in FIG. 9A represents only the first area contained in FIG. 8A, similar to the parallax image illustrated in FIG. 8C.

Figure 9B:
Figure 9C:
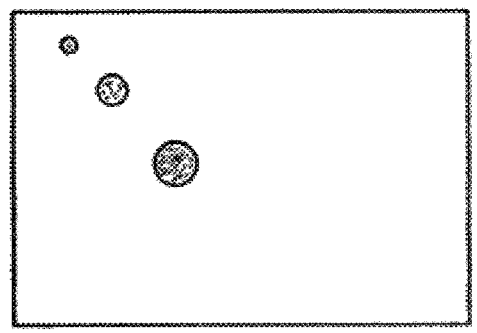

FIG. 9C illustrates an image representing relative difference maximum value information obtained by extracting the maximum value of the relative difference information for each corresponding pixel position among the relative difference images (relative difference information) in FIGS. 8C, 8E, and 9A. In this embodiment, the relative difference maximum value information in FIG. 9C is information having the same value as that of relative difference information illustrated in FIGS. 8C and 9A, and contains a position and amount of the first area contained in the parallax image illustrated in FIG. 8A.

Figure 8F:
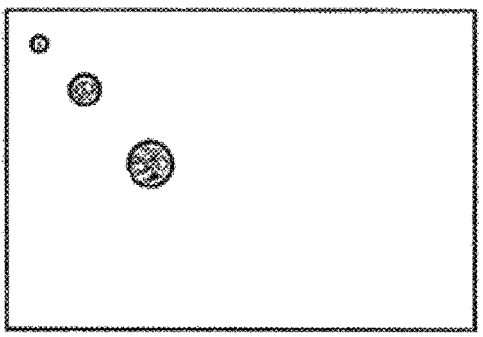
Figure 9D:
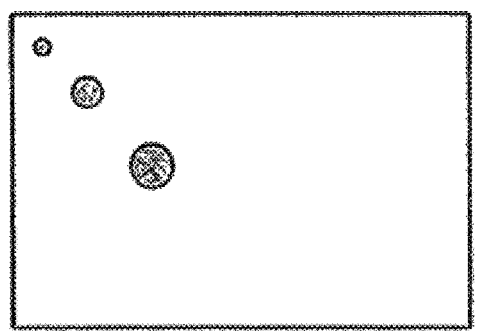
Figure 9E:
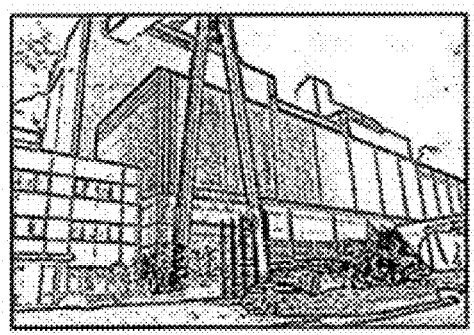
Figure 9F:
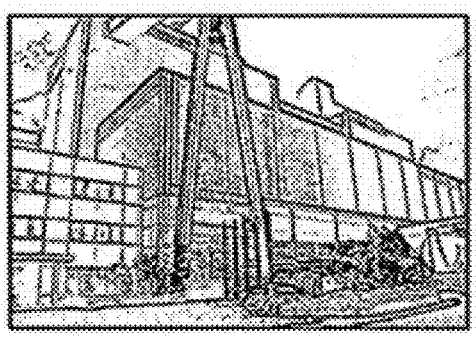

FIG. 8D illustrates the relative difference image obtained by subtracting the parallax image (subtraction image) illustrated in FIG. 8A from a base image that is set to the parallax image illustrated in FIG. 8B. FIG. 8F illustrates the relative difference image obtained by subtracting the parallax image (subtraction image) illustrated in FIG. 10A from the base image that is set to the parallax image illustrated in FIG. 8B. FIG. 9B illustrates the relative difference image obtained by subtracting the parallax image (subtraction image) illustrated in FIG. 10B from the base image that is set to the parallax image illustrated in FIG. 8B. FIG. 9D is an image representing relative difference maximum value information obtained by extracting the maximum value of the relative difference information for each corresponding pixel position among the relative difference images in FIGS. 8D, 8F and 9B. In this embodiment, the relative difference maximum value information in FIG. 9D is information having the same value as that of relative difference information illustrated FIGS. 8D and 8F, and contains a position and amount of the first area contained in the parallax image illustrated in FIG. 8B.

Figure 10C:
Figure 10E:
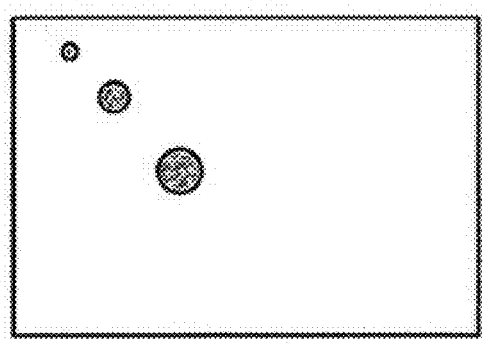
Figure 11A:
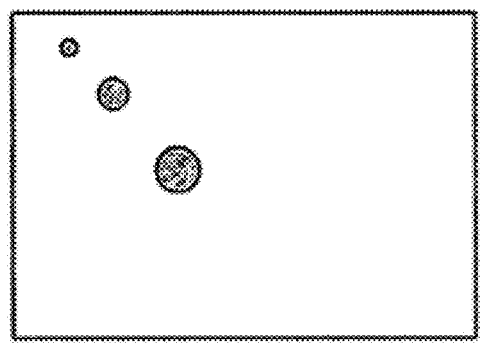
FIGS. 11A-11F are other views for explaining image processing performed in the second embodiment.
Figure 11B:
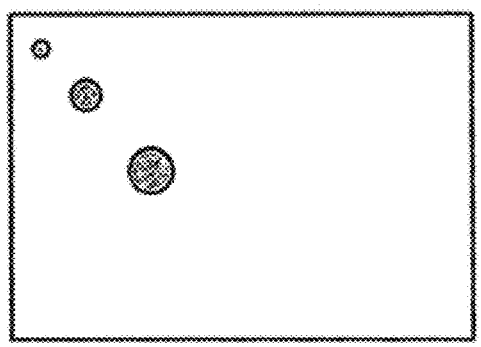
Figure 11C:
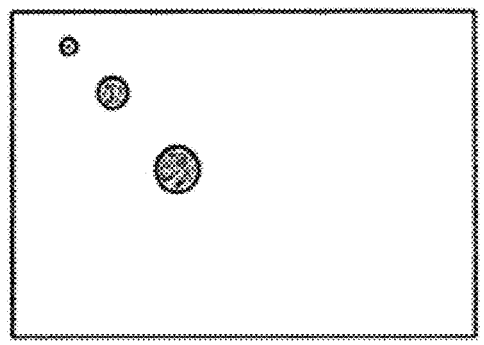

Similarly, FIG. 10C illustrates the relative difference image obtained by subtracting the parallax image (subtraction image) illustrated in FIG. 8A from a base image that is set to the parallax image illustrated in FIG. 10A. FIG. 10E illustrates the relative difference image obtained by subtracting the parallax image (subtraction image) illustrated in FIG. 8B from the base image that is set to the parallax image illustrated in FIG. 10A. FIG. 11A illustrates the relative difference image obtained by subtracting the parallax image (subtraction image) illustrated in FIG. 10B from the base image that is set to the parallax image illustrated in FIG. 10A. FIG. 11C is an image representing relative difference maximum value information obtained by extracting the maximum value of the relative difference information for each corresponding pixel position among the relative difference images in FIGS. 10C, 10E and 11A. In this embodiment, the relative difference maximum value information in FIG. 11C is information having the same value as that of relative difference information illustrated FIGS. 10E and 11A, and contains a position and amount of the first area contained in the parallax image illustrated in FIG. 10A.

Figure 10D:
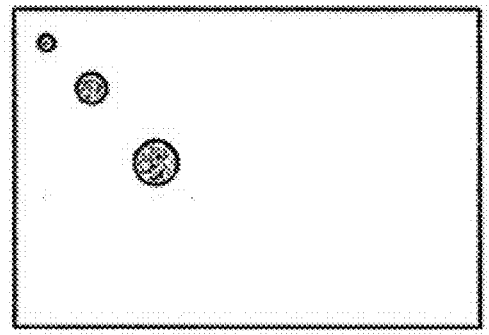
Figure 10F:
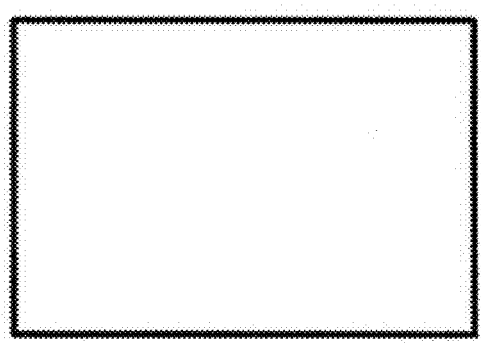
Figure 11D:
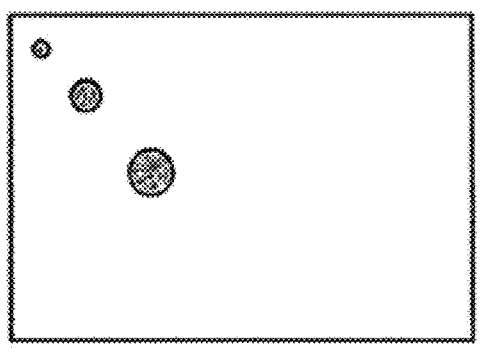
Figure 11E:
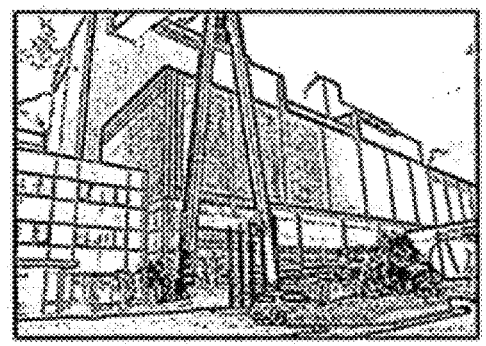
Figure 11F:
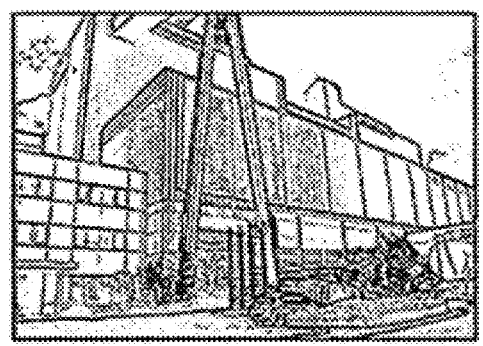

Similarly, FIG. 10D illustrates the relative difference image obtained by subtracting the parallax image (subtraction image) illustrated in FIG. 8A from a base image that is set to the parallax image illustrated in FIG. 10B. FIG. 10F illustrates the relative difference image obtained by subtracting the parallax image (subtraction image) illustrated in FIG. 8B from the base image that is set to the parallax image illustrated in FIG. 10B. FIG. 11B illustrates the relative difference image obtained by subtracting the parallax image (subtraction image) illustrated in FIG. 10A from the base image that is set to the parallax image illustrated in FIG. 10B. FIG. 11D is an image representing relative difference maximum value information obtained by extracting the maximum value of the relative difference information for each corresponding pixel position among the relative difference images in FIGS. 10D, 10F and 11B. In this embodiment, the relative difference maximum value information in FIG. 11D is information having the same value as that of relative difference information illustrated FIGS. 10D and 11B, and contains a position and amount of the first area contained in the parallax image illustrated in FIG. 10B.

Next, the correction process configured to reduce the first area illustrated in FIGS. 9C, 9D, 11C and 11D detected as described above is performed for the original parallax images illustrated in FIGS. 8A, 8B, 10A and 10B. Thereby, the pair of parallax images can be obtained as images for recordings in which the first area is reduced (almost eliminated) as illustrated in FIGS. 9E, 9F, 11E and 11F. One image for recording can be generated which is equivalent with the captured image generated by image capturing without a pupil division and contains few first area, as illustrated in FIG. 2B, by combining the pair of parallax images in which the first area is reduced.

This embodiment can also perform the display process (providing step) configured to display the first area specified in the above step, as a preview image, before the image for recording is recorded, on the display unit 205 or the external display apparatus, with or separate from the second area other than the first area in the captured image. In this case, as described in the first embodiment, the first area may be highlighted and displayed or the result of the correction process of the first area may be simultaneously displayed. A transfer to the correction process and the first area as a target of the correction process are as described in the first embodiment.

Figure 12:
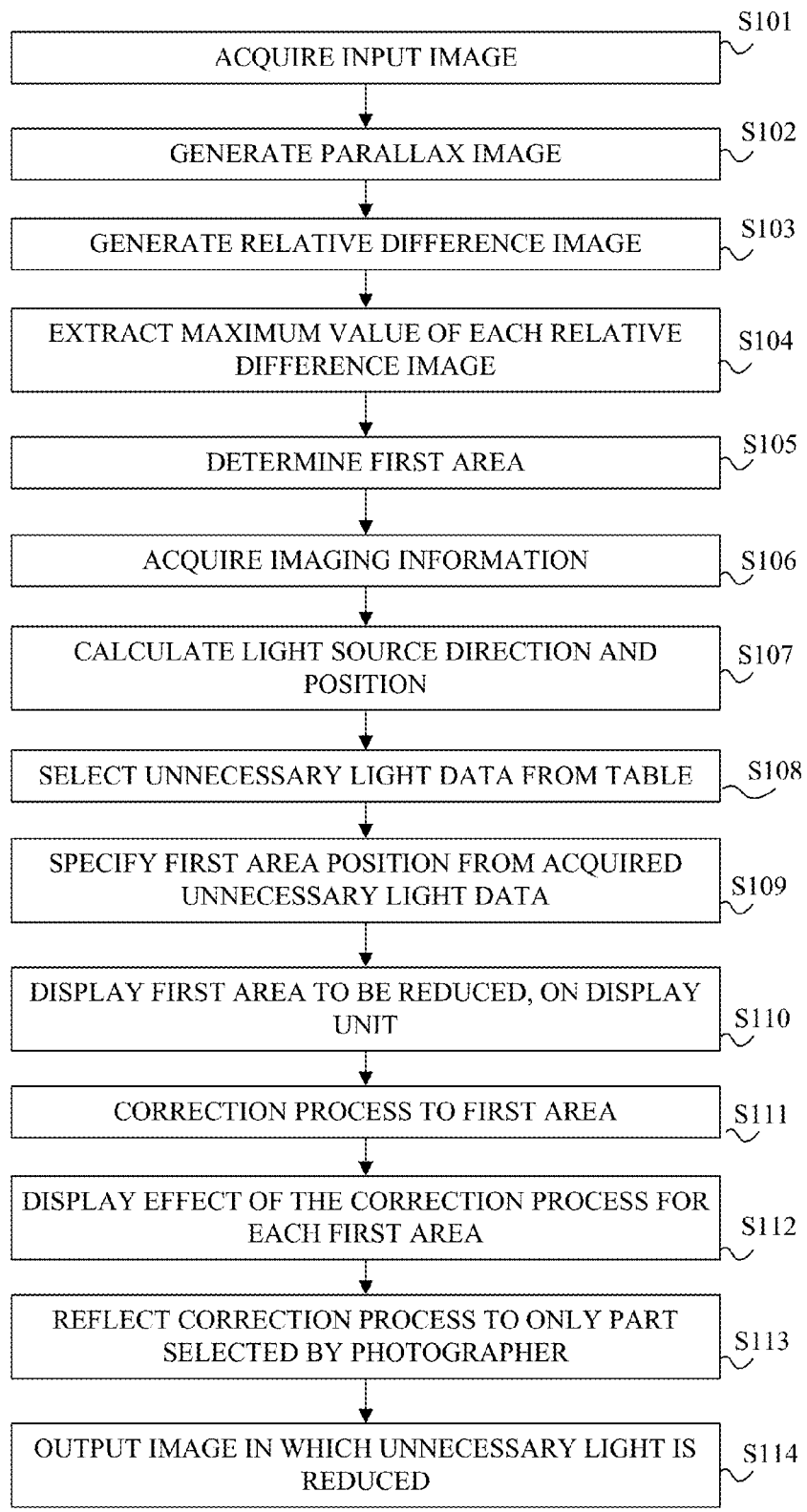
FIG. 12 is a flowchart for the image processing and an operation of the image capturing apparatus according to the second embodiment.

A flowchart in FIG. 12 indicates a flow of the detection process, the correction process, and the display process of the first area in this embodiment. The system controller 210 and the image processor 204 each serving as a computer execute the above processes in accordance with the image processing program as a computer program.

The steps S101 and S102 are the same as the steps S11 and S12 in the flowchart according to the first embodiment (FIG. 6).

In the step S103, the detector 222 calculates a plurality of relative difference images where each of a set of parallax images is set to the base image. In other words, images illustrated in FIGS. 8C, 8E, and 9A are generated as the relative difference images where FIG. 8A is set to the base image. Images illustrated in FIGS. 8D, 8F, and 9B are generated as the relative difference images where FIG. 8B is set to the base image. Images illustrated in FIGS. 10C, 10E, and 11A are generated as the relative difference images where FIG. 10A is set to the base image. Images illustrated in FIGS. 10D, 10F, and 11B are generated as the relative difference images where FIG. 10B is set to the base image.

When the unnecessary light that has reached the image capturing plane passes different pupil areas in the image capturing optical system 201, the first area appears at different positions for each parallax image as illustrated in FIGS. 8A and 8B. Hence, the difference value of the first area has a positive value or a negative value in the simple relative difference image.

For example, when the subtraction image illustrated in FIG. 8B is subtracted from the base image illustrated in FIG. 8A in order to generate a relative difference image illustrated in FIG. 8C, the first area in the base image has a positive value and the first area in the subtraction image has a negative value. This embodiment truncates the negative value and sets it to 0 (treats the negative value as 0) so as to simplify the subsequent correction process of the first area, as described above. Hence, only the first area having a positive value contained in FIG. 8A is detected from the relative difference image illustrated in FIG. 8C. A similar process is performed for another relative difference image, and only the first area contained in each base image is detected as a positive value.

On the other hand, when the first areas exist at the same positions as illustrated in FIGS. 8A and 10A, the first area is not detected in the relative difference image as described above.

Next, in the step S104, the detector 222 obtains (extracts) the relative difference maximum value information for each corresponding pixel position among the plurality of (three) relative difference images obtained in the step S103. The reason and effect for obtaining the relative difference maximum value information will be again discussed below although the description about the image illustrated in FIG. 8E refers to them.

The first areas may exist at the same positions among the parallax images depending on the position of the high luminance light source or the image capturing optical system. In this embodiment, the first areas exist at the same positions among the parallax images illustrated in FIGS. 8A and 10A. When a difference between the two parallax images is calculated, the first area has a value of 0. In other words, the undetectable first area may occur only based on the difference information between two parallax images.

Accordingly, this embodiment obtains relative difference information among four parallax images, and detects the first area that would not be detected only by two parallax images. In other words, when the parallax image illustrated in FIG. 8A is set to the base image, the first areas exist at the same positions between the base image and the parallax image illustrated in FIG. 10A, and thus the first area is not detected. However, the first areas exist at different positions between the base image illustrated in FIG. 8A and the parallax image illustrated in FIG. 8B, and thus the first area can be detected as in the relative difference image illustrated in FIG. 8C.

Thus, this embodiment obtains a plurality of pieces of relative difference information as a difference between the base image and the other parallax image, and obtains the relative difference maximum value information among the plurality of pieces of relative difference information. Thereby, if there is at least one parallax image having a position of the first area different from that of the base image, the position and amount of the first area can be detected.

Next, in the step S105, the detector 222 determines the remaining component in the image (also referred to as a "relative difference maximum value image" hereinafter) as the first area, which represents the relative difference maximum value information obtained in the step S104. Thus, the first area in each original parallax image can be detected.

Next, in the step S106, the image processor 204 obtains information of the image capturing apparatus in the image capturing. More specifically, the information contains an attitude information of the image capturing apparatus (information representing the attitude of the image sensor 202), an ID number, and a type number, and an image capturing condition (such as an F-number, a focal length, and an object distance) of the image capturing optical system 201.

Next, in the step S107, the light source direction estimator 221 generates a three-dimensional map of the object illustrated in FIG. 13 based on the plurality of parallax images generated in the step S102, and three-dimensionally builds the object. The three-dimensional map generating method is similar to that of the first embodiment. Moreover, the above method obtains light source data (the position, the direction, and the luminance of the light source) using the three-dimensional map and the method described in the first embodiment.

Next, in the step S108, the detector 222 selects and obtains the unnecessary light data based on the unnecessary light DB 227, the information of the image capturing apparatus in the image capturing obtained in the step S106, and the light source data obtained in the step S107. In this stage, the reduction effect of the first area represented by the unnecessary light data obtained from the unnecessary light DB 227 can be predicted.

Next, in the step S109, the detector 222 specifies the position of the first area in each parallax image represented by the unnecessary light data obtained in the step S108.

Next, in the step S110, the display unit 224 displays the specified first area as the pre-recorded preview image of the image for recording on the display unit 205 or the external display apparatus with or separate from the second area other than the first area. As described above, the first area may be highlighted and displayed, when the specified first area is displayed with each parallax image.

Next, in the step S111, the reducer 223 performs the correction process configured to reduce the first area for the set of parallax images obtained by image capturing, and generates the set of parallax images in which the first area is reduced.

This embodiment generates the parallax image (FIG. 9E) from the output signal of the G11 pixel group illustrated in FIG. 7A, the parallax image (FIG. 9F) from the output signal of the G12 pixel group, the parallax image (FIG. 11E) from the output signal of the G13 pixel group, and the parallax image (FIG. 11F) from the output signal of the G14 pixel group. In this case, the step S103 truncates the negative value, sets it to 0, and detects only the first area having a positive value contained in each parallax image as relative difference maximum value information. Thus, the first area can be reduced (eliminated) by simply subtracting the relative difference maximum value image from each parallax image. In other words, this embodiment obtains the set of parallax images (FIGS. 9E, 9F, 11E, and 11F) in which the first area is reduced, by subtracting the relative difference maximum value image illustrated in FIG. 9C from the parallax image illustrated in FIG. 8A, by subtracting the relative difference maximum value image illustrated in FIG. 9D from the parallax image illustrated in FIG. 8B, by subtracting the relative difference maximum value image illustrated in FIG. 11C from the parallax image illustrated in FIG. 10A, and by subtracting the relative difference maximum value image illustrated in FIG. 11D from the parallax image illustrated in FIG. 10B. Thereby, the set of parallax images (FIGS. 9E, 9F, 11E, and 11F) are obtained in which the first area is reduced.

Next, in the step S112, the display unit 224 displays the set of parallax images (image for recording) in which each specified first area is corrected, on the display unit 205 or the external display apparatus so as to exhibit the reduction effect for each specified first area. Thereby, the user can know how much the first area is reduced before the image for recording is recorded.

Next, in the step S113, the display unit 224 reflects the result of the correction process only for the first area selected by the user among the specified first area. This configuration can generate, for example, a set of parallax images in which the first area desired to leave by the user is not reduced or a set of parallax images for recording in which a component other than the first area is not reduced, which has been determined as the first area due to an false detection.

Finally, in the step S114, the system controller 210 records the set of parallax images in which the first area illustrated in FIGS. 9E, 9F, 11E, and 11F is reduced or removed, as the image for recording in an image recording medium through the recorder 209 or displays the set of parallax images on the display unit 205. As illustrated in FIG. 2B, a combination of the set of parallax images enables one image for recording to be recorded or displayed in which the first area is sufficiently reduced and which is equivalent with the captured image generated by the image capturing without a pupil division.

As described above, this embodiment can detect the first area in each parallax image (base image) using the difference (relative difference information) between each base image and each of the other three parallax images when each of the four parallax images obtained by once image capturing is set to the base image. In other words, the first area contained in the captured image can be detected without a plurality of image captures. In order to truncate the first area having a negative value in generating the relative difference information, the first area having a positive value can be detected only by a simple subtraction. Hence, a high-quality image for recording can be obtained in which the first area is well reduced (removed) only by subtracting this first area from the original parallax image.

Moreover, this embodiment obtains the relative difference maximum value information from the relative difference information among the four parallax images. Hence, for example, even when two of the four parallax images have the same positions of the first areas, if the other parallax images have different positions of the first areas, the first area can be detected and the images for recording in which the detected first areas are reduced can be obtained.

This embodiment also displays, before the post-captured image for recording is recorded, the first area to be reduced for the user and thus the user can predict the reduction result of the first area before the image for recording is recorded. Therefore, the first area to be reduced can be surely reduced, and the second area that is not the first area is prevented from being reduced.

This embodiment obtains relative difference information (relative difference image) as a difference between each base image and each of the other three parallax images where each of the four parallax images is set to the base image, and detects the first area of the parallax image using each parallax image and the relative difference information when each parallax image is set to the base image. However, it is not always necessary to use four parallax images, and two parallax images may be used as described for the first embodiment or three or more parallax images may be used. In other words, at least one piece of relative difference information may be obtained for each of the plurality of parallax images.

Each of the above embodiments can display the specified first area as an image. Thus, the user can previously recognize the first area to be reduced by the reducing process. Hence, the first area to be reduced can be surely reduced, and the second area that is not the first area is prevented from being reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-005278, filed on Jan. 14, 2016, which is hereby incorporated by reference herein in its entirety.

What is claimed is:

1. An image processing apparatus comprising:
one or more processors; and
a memory storing instructions which, when executed by the one or more processors, cause the image processing apparatus to:
acquire an input image generated by image capturing;
specify a first area in which unnecessary light contained in the input image is detected;
perform, for the input image, a reducing process configured to reduce an image component of the specified first area;
display the first area on a display unit, specified in the input image, so that the first area can be recognized in the input image; and
acquire a plurality of parallax images each serving as the input image having a parallax generated by capturing an object at mutually different viewpoints,
wherein in the specifying, the first area is specified by setting a base image to each of the plurality of parallax images, and subtracting each remaining parallax image other than base image in the plurality of parallax images from the base image.

2. The image processing apparatus according to claim 1, wherein the instructions, when executed by the one or more processors, further cause the image processing apparatus to display the first area separate from a second area other than the first area in the input image.

3. The image processing apparatus according to claim 1, wherein the instructions, when executed by the one or more processors, further cause the image processing apparatus to highlight the first area.

4. The image processing apparatus according to claim 1, wherein in specifying the first area, the instructions, when executed by the one or more processors, cause the image processing apparatus to:
acquire a plurality of parallax images each serving as the input image having a parallax generated by capturing an object at mutually different viewpoints;
acquire distance data as data relating to a distance of the object using the plurality of parallax images;
acquire plane normal data as data relating to a plane normal of each of a plurality of planes in the object using the distance data;
acquire light source data as data relating to a light source configured to irradiate the object in the image capturing using the plane normal data and luminance of each of the plurality of planes;
acquire unnecessary light data as data relating to the first area using the light source data and information on an image capturing condition of the image capturing; and
specify the first area using the unnecessary light data.

5. The image processing apparatus according to claim 4, wherein the instructions, when executed by the one or more processors, further cause the image processing apparatus to generate a map representing a three-dimensional shape of the object based on the distance data, and acquires the plane normal data in the plurality of planes using the map.

6. The image processing apparatus according to claim 4, wherein the unnecessary light data contains data of at least one of a position, an intensity, a hue, a magnitude, and a shape of the first area.

7. The image processing apparatus according to claim 4, wherein the memory stores a database of the unnecessary light data, and
wherein in acquiring unnecessary light data, the instructions, when executed by the one or more processors, cause the image processing apparatus to acquire the unnecessary light data based on the database, the light source data, and the information on the image capturing condition in the image capturing.

8. The image processing apparatus according to claim 1, wherein the instructions, when executed by the one or more processors, further cause the image processing apparatus to:
enable a user to perform a selection; and
perform the reducing process for the imaging component of the first area selected.

9. The image processing apparatus according to claim 1, wherein the instructions, when executed by the one or more processors, further cause the image processing apparatus to record an image for recording in a recording medium, in which the imaging component of the first area is reduced by the reducing process.

10. image capturing apparatus comprising:
an image processing apparatus that includes one or more processors, and a memory; and
an image capturing system configured to generate an input image through image capturing,
wherein the memory stores instructions which, when executed by the one or more processors, cause the image processing apparatus to:
acquire an input image generated by image capturing;
specify a first area in which unnecessary light contained in the input image is detected;
perform, for the input image, a reducing process configured to reduce an imaging component of the specified first area;
display the first area on a display unit, specified in the input image, so that the first area can be recognized in the input image; and
acquire a plurality of parallax images each serving as the input image having a parallax generated by capturing an object at mutually different viewpoints,
wherein in the specifying, the first area is specified by setting a base image to each of the plurality of parallax images, and subtracting each remaining parallax image other than base image in the plurality of parallax images from the base image.

11. An image capturing apparatus comprising:
an image processing apparatus that includes one or more processors, and a memory storing instructions which, when executed by the one or more processors, cause the image processing apparatus to:
acquire an input image generated by image capturing,
specify a first area in which unnecessary light contained in the input image is detected,
perform, for the input image, a reducing process configured to reduce an image component of the specified first area; and
display the first area on a display unit, specified in the input image, so that the first area can be recognized in the input image; and
an image capturing system configured to generate each parallax image through image capturing,
wherein the instructions, when executed by the one or more processors, further cause the image processing apparatus to:
acquire a plurality of parallax images as input images having a parallax generated by capturing an object at mutually different viewpoints,
acquire distance data as data relating to a distance of the object using the plurality of parallax images, acquire plane normal data as data relating to a plane normal of each of a plurality of planes in the object using the distance data, acquire light source data as data relating to a light source configured to irradiate the object in the image capturing using the plane normal data and luminance of each of the plurality of planes, and acquire unnecessary light data as data relating to the first area using the light source data and information relating to an image capturing condition of the image capturing, wherein in the specifying, the first area is specified using the unnecessary light data, and wherein the image capturing system includes an image sensor including a plurality of imaging pixels, each of which has one micro lens and a plurality of sub pixels, and generates each parallax image using a signal obtained for each sub pixel in the plurality of imaging pixels.

12. A non-transitory computer-readable storage medium for storing an image processing program as a computer program that enables a computer to perform image processing for an input image generated by image capturing, the image processing comprising:

specifying a first area contained in the input image, in which unnecessary light is detected;

performing, for the input image, a reducing process configured to reduce an image component of the first area specified by the specifying;

displaying the first area on a display unit, specified by the specifying in the input image, so that the first area can be recognized in the input image; and acquiring a plurality of parallax images each serving as the input image having a parallax generated by capturing an object at mutually different viewpoints, wherein the specifying specifies the first area by setting a base image to each of the plurality of parallax images, and subtracting each remaining parallax image other than base image in the plurality of parallax images from the base image.

13. An image processing apparatus comprising:

one or more processors; and a memory storing instructions which, when executed by the one or more processors, cause the image processing apparatus to:

acquire an input image generated by image capturing;

specify a first area in which unnecessary light contained in the input image is detected;

perform, for the input image, a reducing process configured to reduce an image component of the specified first area;

display the first area on a display unit, specified in the input image, so that the first area can be recognized in the input image;

acquire a plurality of parallax images each serving as the input image having a parallax generated by capturing an object at mutually different viewpoints;

acquire distance data as data relating to a distance of the object using the plurality of parallax images;

acquire plane normal data as data relating to a plane normal of each of a plurality of planes in the object using the distance data;

acquire light source data as data relating to a light source configured to irradiate the object in the image capturing using the plane normal data and luminance of each of the plurality of planes; and acquire unnecessary light data as data relating to the first area using the light source data and information on an image capturing condition of the image capturing, wherein in the specifying, the first area is specified using the unnecessary light data.

14. A non-transitory computer-readable storage medium for storing an image processing program as a computer program that enables a computer to perform image processing for an input image generated by image capturing, the image processing comprising:

specifying a first area contained in the input image, in which unnecessary light is detected;

performing, for the input image, a reducing process configured to reduce an image component of the first area specified by the specifying;

displaying the first area on a display unit, specified by the specifying in the input image, so that the first area can be recognized in the input image;

acquiring a plurality of parallax images each serving as the input image having a parallax generated by capturing an object at mutually different viewpoints;

acquiring distance data as data relating to a distance of the object using the plurality of parallax images;

acquiring plane normal data as data relating to a plane normal of each of a plurality of planes in the object using the distance data;

acquiring light source data as data relating to a light source configured to irradiate the object in the image capturing using the plane normal data and luminance of each of the plurality of planes; and acquiring unnecessary light data as data relating to the first area using the light source data and information on an image capturing condition of the image capturing, wherein in the specifying, the first area is specified using the unnecessary light data.

* * * * *